United States Patent

Ueda et al.

[11] Patent Number: 5,107,337
[45] Date of Patent: Apr. 21, 1992

[54] AUTOMATIC FOCUSING APPARATUS OF VIDEO CAMERA

[75] Inventors: Hideji Ueda, Yao; Keinosuke Kanashima, Osaka; Daisuke Oogawara, Itami; Hiroshi Yasumoto, Katano, all of Japan

[73] Assignee: Matsushita Electric Industrial Co., Ltd., Kadoma, Japan

[21] Appl. No.: 556,548

[22] Filed: Jul. 24, 1990

[51] Int. Cl.$^5$ .............................................. H04N 5/232
[52] U.S. Cl. .................................. 358/227; 358/209; 358/213.19
[58] Field of Search ............... 358/209, 227, 228, 225, 358/169, 213.19; 354/400, 402, 404

[56] References Cited

U.S. PATENT DOCUMENTS

| | | | |
|---|---|---|---|
| 4,484,806 | 11/1984 | Onishi et al. | 354/404 |
| 4,523,829 | 6/1985 | Eguchi et al. | 354/406 |
| 4,615,598 | 10/1986 | Koshiishi | 354/402 |
| 4,638,364 | 1/1987 | Hiramatsu | 358/227 |
| 4,967,279 | 10/1990 | Murashima | 358/227 |

Primary Examiner—Howard W. Britton
Assistant Examiner—Tuan V. Ho
Attorney, Agent, or Firm—Cushman, Darby & Cushman

[57] ABSTRACT

An optical system of a video camera is moved to a plurality of positions having a minute predetermined interval, and detected video images of an object at the respective positions are memorized in a frame memory in turn, the video images are compared with each other, and the video image having the highest contrast is selected, thus the position at which the video image having the highest contrast is detected is recognized as a focused position, and the optical system is shifted to the position.

9 Claims, 5 Drawing Sheets

AUTOMATIC FOCUSING APPARATUS OF VIDEO CAMERA

FIELD OF THE INVENTION AND RELATED ART STATEMENT

1. Field of the Invention

The present invention relates generally to an automatic focusing apparatus of a video camera, and more particularly to an automatic focusing apparatus for focusing the video camera on the basis of an video image which is detected by the video camera itself.

2. Description of the Related Art

An example of the automatic focusing apparatus in the prior art is shown in FIG. 6. Referring to FIG. 6, a video image sensor 1 detects an image of an object 3 through an optical lens 2 and a half-mirror 4. The position of the optical lens 2 is controlled by an automatic focusing controller 7 which drives a driving mechanism 9 to move the optical lens 2.

An incident light from the object 3 which passes the optical lens 2 is divided into two parts by the half-mirror 4. One of the two parts is introduced on the video image sensor 1 through the half-mirror 4. The other is reflected by the half-mirror 4 and is directed to a half-mirror 4A through a light path 5. The incident light through the light path 5 is divided into two parts by the half-mirror 4A. One of them is applied to a part 6C of a line-sensor 6 through a light path 5B and is detected thereby. Another part is reflected by the half-mirror 4A and is directed to a total reflection mirror 4B through a light path 5A and is reflected thereby. The reflected light is applied to a part 6B of the line-sensor 6 through a light path 5C and is detected thereby.

The output of the line-sensor 6 is shown in a graph of FIG. 7. Referring to FIG. 7, the abscissa is graduated by a distance in a scanning direction (shown by arrow A) of the line-sensor 6, and the ordinate is graduated by an output level thereof. In the example shown in FIG. 7, the output level at the part 6C of the line-sensor 6 which is activated by the light coming through the light paths 5 and 5B is larger than the output level at the part 6B of the line-sensor 6 which is activated by the light coming through the light paths 5, 5A and 5C. The output level of the line-sensor 6 substantially represents a contrast of an optical image at a part of the object 5 which is led onto the line-sensor 6.

Referring to FIG. 6, the sum of the light paths 5, 5A and 5C in length is longer than the sum of the light paths 5 and 5B in length. Therefore, a distance between the optical lens 2 and the object 3, when the optical image of the object 3 is focused on the part 6B of the line-sensor 6, is different from the corresponding distance when it is focused on the part 6C of the line-sensor 6.

In FIG. 7, the wave-form of the signal detected at the part 6C has a steep slope and a high peak. On the contrary, the wave-form of the signal detected at the part 6B has a gentle slope and a low peak. Consequently, the contrast of the signal detected at the part 6C is higher than that detected at the part 6B, and hence the object 3 is focused on the part 6C.

In the prior art shown in FIG. 6, the position of the optical lens 2 is controlled by the automatic focusing controller 7 through the driving mechanism 9 so that the respective detected levels at the parts 6C and 6B of the line-sensor 6 are equalized. Thus, equalization of the above-mentioned detected levels is recognized as a focused state.

In the automatic focusing apparatus in the prior art, two half-mirrors 4 and 4A, the total reflection mirror 4B and the line sensor 6 must be provided in addition to the video image sensor 1 and the optical lens 2. Moreover, the line-sensor 6 is expensive, and thus, the automatic focusing apparatus has a complicated construction and becomes costly. Additionally, there is difficulty in miniaturization of the apparatus.

OBJECT AND SUMMARY OF THE INVENTION

An object of the present invention is to provide an automatic focusing apparatus for focusing a video camera to an object by using the image signal detected by the video camera. The automatic focusing apparatus in accordance with the present invention comprises:

a video camera having a video image sensing element and an optical system for forming an optical image of an object on the video image sensing element, a focusing mechanism for moving the optical system in focusing operation, a focusing mechanism driving apparatus for driving the focusing mechanism, a scanning line selection circuit for selecting a predetermined number of scanning lines from scanning lines of one field, an A/D converter for converting a detected image signal into digital image data, a frame memory for memorizing the digital image data subdivided into a plurality of address, a memory address control circuit for appointing address in which the digital image data is memorized, calculation means for calculating contrasts of video image signals memorized in the frame memory, comparing means for comparing the contrasts of the video images with each other and determining a video image having the highest value in the contrast in the detected video images, address determining means for determining an address memorizing the video image having the highest contrast is memorized, and a focus setting circuit for outputting a signal to the focusing mechanism driving apparatus representing the position of the optical system corresponding to the address.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
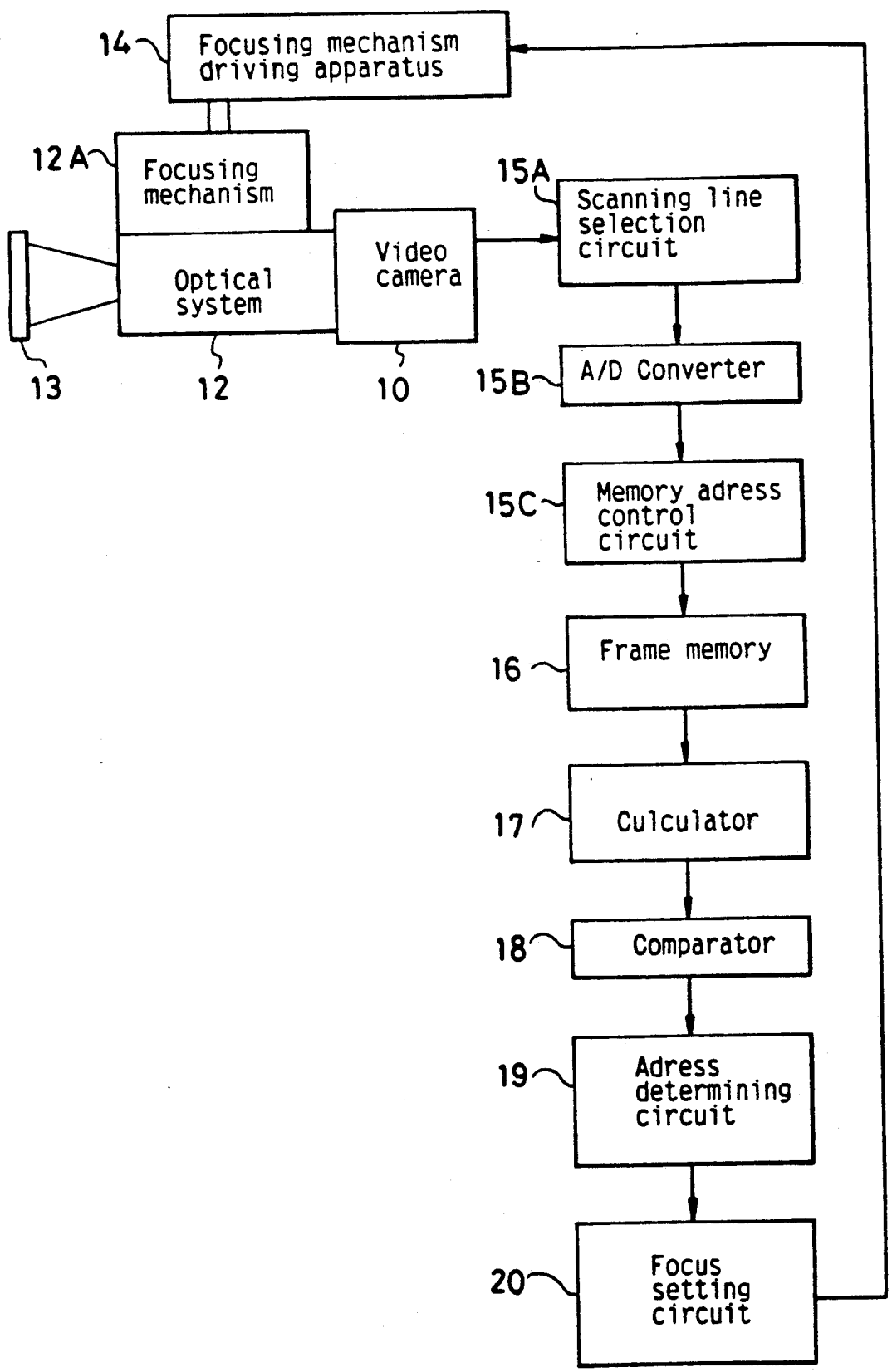
FIG. 1 is a block diagram of an embodiment of an automatic focusing apparatus in accordance with the present invention.
Figure 2:
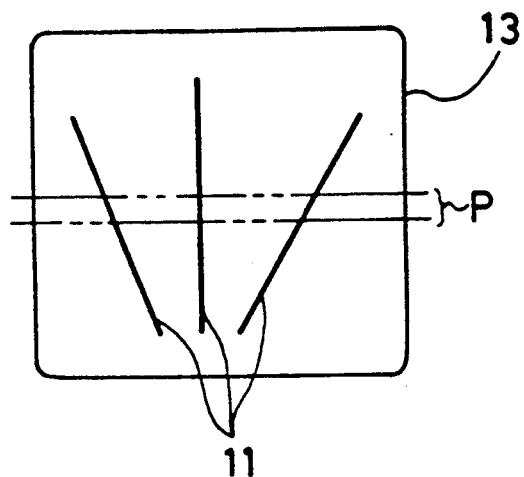
FIG. 2 is a plan view of an object to be detected.

FIG. 1 is a block diagram of an embodiment of an automatic focusing apparatus in accordance with the present invention. Referring to FIG. 1, a video camera 10 detects an object 13 though an optical system 12. The object 13 is, as shown in FIG. 2, provided with three straight lines on the surface thereof, for example. A focusing mechanism driving apparatus 14 drives a focusing mechanism 12A to move the optical system in order to focus it. A moving range of the optical system 12 for the focusing operation is under 50 $\mu$m, and a high speed operation is required. Therefore, a piezoelectric element is suitable for the driving means of the focusing mechanism driving apparatus 14.

In the embodiment, the moving range of the optical system 12 are 32 $\mu$m. The moving range of 32 $\mu$m is subdivided into 16 segments each of which is 2 $\mu$m in interval. The optical system 12 is shifted to the positions of the respective segments having 2 $\mu$m of interval therebetween. The moving speed of the focusing mechanism driving apparatus using the piezoelectric element is 1 $\mu$m/ms, for example.

A video camera control apparatus 15 supplies a control signal to the focusing mechanism driving apparatus 14 to move the optical system 12 to a predetermined position. The image signal detected by the video camera 10 is applied to the video camera control apparatus 15 and is processed in such a manner described hereafter.

Figure 3:
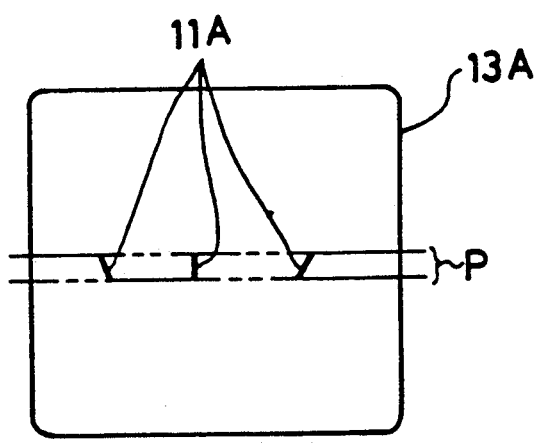
FIG. 3 is a detected image of the object.

The patterns 11 of the object 13 shown in FIG. 2 are detected by the video camera 10. In the focusing operation using any known automatic focusing technique, a predetermined part P of the image 13A detected by the video camera, shown in FIG. 3, is used for the automatic focusing operation. The detected image 13A contains the aforementioned three segments 11A of the patterns 11. The part P is represented by five scanning lines of the video camera 10, for example. The image of the part P is memorized in a frame memory 16.

Figure 4:
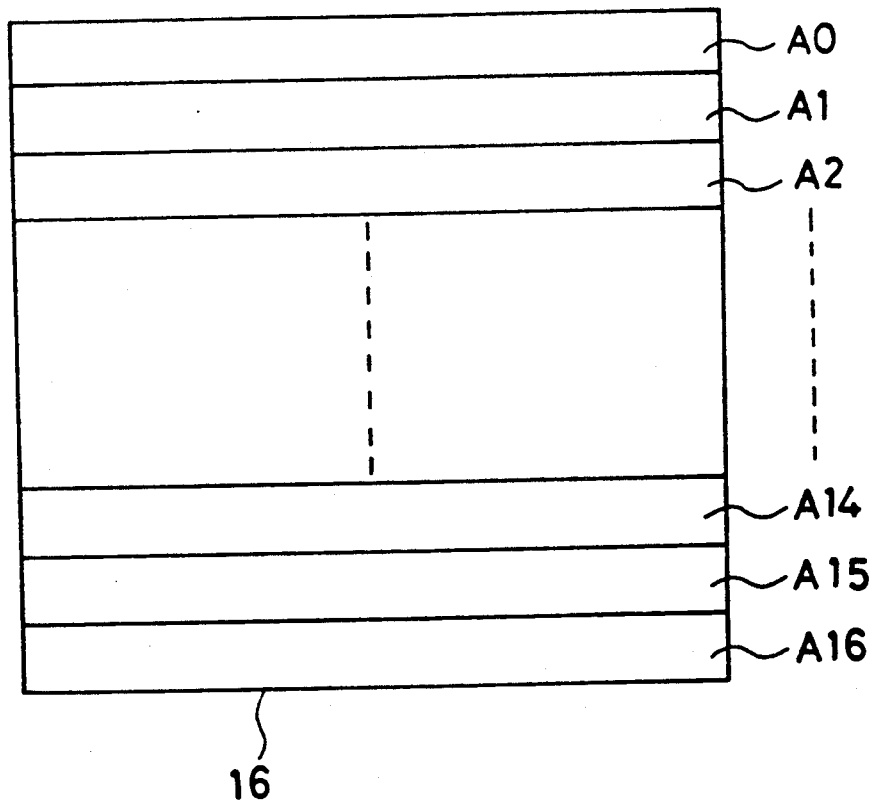
FIG. 4 is a chart of address allocation in a frame memory.

An address allocation in the frame memory 16 is shown in FIG. 4. Referring to FIG. 4, the area of the frame memory 16 is subdivided into seventeen addresses. These addresses are labeled as A0, A1, A2-A14, A15 and A16, respectively. These addresses correspond with the positions of the optical system 12 in the moving range (0-32 $\mu$m) of the optical system 12. For example, when the optical system 12 is positioned at an initial position (0 $\mu$m), the data of the detected video image of the part P is memorized in the address A0. For further example, when the optical system 12 is positioned at the position of 2 $\mu$m forward from the initial position, the data of the detected image of the part P is memorized in the address A1. For another example, when the optical system 12 comes at the position of 32 $\mu$m forward from the initial position, the data of the image of the part P is memorized in the address A16.

As mentioned above, the detection of the part P is repeated seventeen times in synchronism with the stepwise shift of the position of the optical system 12 forward from the initial position (0 $\mu$m) to the final position (32 $\mu$m).

Five scanning lines in which the partial pattern 11A of the pattern 11 in the part P is contained are selected from the scanning lines of one field by a scanning line selection circuit 15A. The image signals of the selected scanning lines are converted into digital data by an A/D converter 15B, and is inputted to a memory address control circuit 15C.

In the memory address control circuit 15C, the digital image data of the partial pattern 11A which are detected at the respective positions of the optical system 12 are appointed addresses to be memorized in the frame memory 16. Thus, the data of the video images of the parts P at the respective positions of the optical system 12 are memorized in the addresses A0-A16 of the frame memory 16 in the detected sequence. One detection process of the part P is accomplished by one scanning process of a field of the video camera 10. The positions of the video camera 10 and optical system 12 with respect to the object 13 are adjusted in advance in a manner that the pattern 11 of the object 13 is focused within 32 $\mu$m of moving range of the optical system 12.

Figure 5A:
FIGS. 5(a) and 5(b) are detected video images of the object.
Figure 5B:
Figure 6:
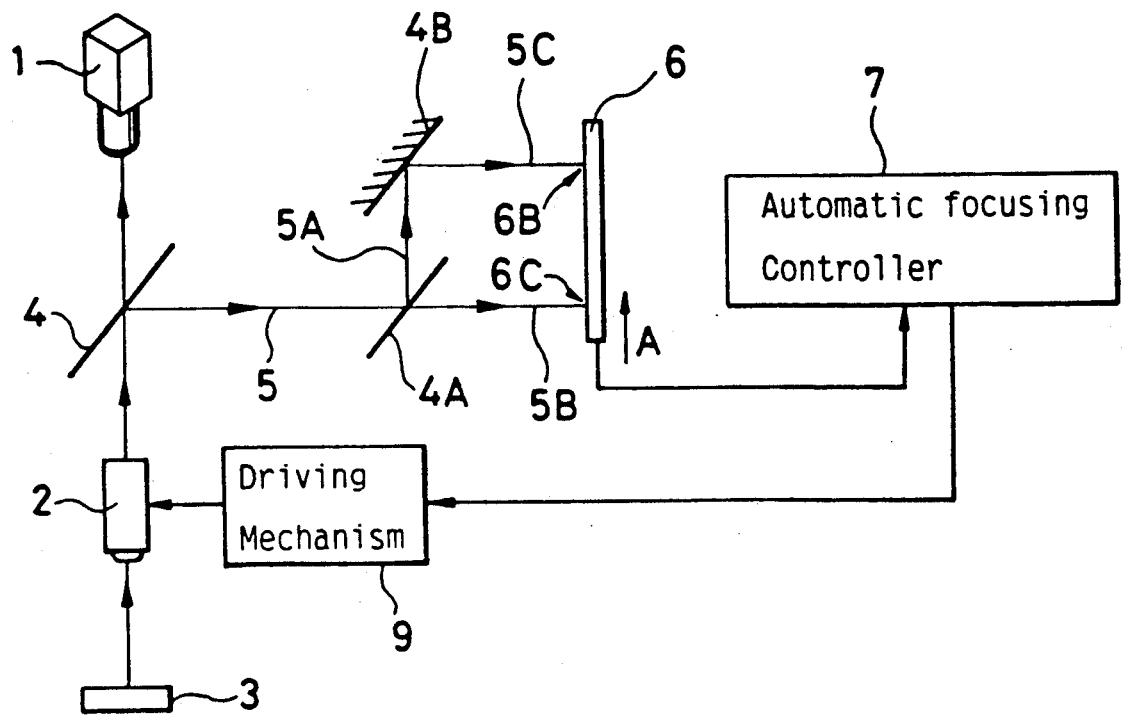
FIG. 6 is the block diagram of the automatic focusing apparatus in the prior art.
Figure 7:
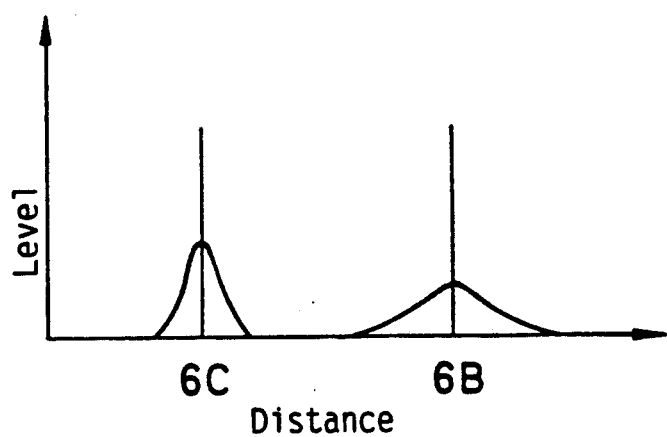
FIG. 7 is the graph of an output signal of the line-sensor of the automatic focusing apparatus in the prior art.

Determination of focused state is performed as follows. FIGS. 5(a) and 5(b) show video images of the part P. FIG. 5(a) shows the detected video image which is focused on the patterns 11, and FIG. 5(b) shows the detected video image which is out of focus. The detected video image shown in FIG. 5(a) has a higher contrast in comparison with the detected image shown in FIG. 5(b). The value of the contrast is detected on the basis of the signal level of the detected video image in a calculator 17.

The contrasts of the video images in the respective addresses A0-A16 of the frame memory 16 are compared with each other in a comparator 18, and the image data having the highest contrast is determined. Subsequently, an address of the frame memory 16 memorizing the image data having the highest contrast is determined in an address-determining circuit 19. Hence, the position of the optical system 12 corresponding to the address is set in the focusing mechanism driving circuit 14 by a focus setting circuit 20, and a control signal for shifting the optical system 12 to the set position is applied to the focusing mechanism 12A. Thus, the optical system 12 is moved to the position corresponding to the address determined by the address determining circuit 19. Consequently, the video camera 10 is focused on the object 13.

A MOS type image sensing element is preferable to the sensing device of the video camera in the embodiment because of a small size.

The above-mentioned focusing operation is repeated with a predetermined periodic time, for example 50 ms, and thus precise focusing is realized.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An automatic focusing apparatus for a video camera comprising:

a video camera having a video image sensing element for detecting an image signal and an optical system for forming an optical image of an object on said video image sensing element, a focusing mechanism for moving said optical system to perform a focusing operation, a focusing mechanism driving apparatus for driving said focusing mechanism to different focusing positions in a manner that said optical system is stepwise shifted and a plurality of image signals are detected at every stepwise shift of said optical system.

a scanning line selection circuit for indicating a predetermined number of consecutive scanning lines from scanning lines of one field, wherein said predetermined number represents a small part of said one field, an A/D converter for converting said predetermined number of consecutive scanning lines into digital image data, a frame memory for storing said digital image data, subdivided into a plurality of addresses for each focusing position, a memory address control circuit for setting addresses at which said digital image data are stored, calculation means for calculating contrasts of video images represented by said digital image data stored in said frame memory, wherein each said digital image data respectively represents video images at different ones of said focusing positions, comparing means for comparing said contrasts from said calculating means with each other and determining a video image having a highest value of contrast among said video images, address determining means for determining an optimum focus address where said video image having the highest contrast is stored, and a focus setting circuit for outputting a signal to said focusing mechanism driving apparatus representing a position of the optical system corresponding to said optimum focus address.

2. An automatic focusing apparatus of a video camera in accordance with claim 1, wherein
said calculation means calculates said contrasts on the basis of amplitudes of said video images.

3. An automatic focusing apparatus of a video camera in accordance with claim 1, wherein
said focusing mechanism driving apparatus comprises a piezoelectric element.

4. An automatic focusing apparatus in accordance with claim 1, wherein said scanning line selection circuit selects five consecutive scanning lines.

5. An automatic focusing apparatus in accordance with claim 1, wherein said focusing mechanism driving apparatus stepwise shifts said optical system through a range from an initial position to a final position representing an entire range of possible focus positions, said calculating means calculates contrast of all of said video images corresponding to each of said stepwise shifts, and said comparing means compares each of said contracts to determine a best focusing position among all of said possible focus positions.

6. An automatic focusing apparatus as in claim 5, wherein there are seventeen of said focusing positions.

7. An automatic focusing apparatus of a video camera comprising:

a video camera having a video image sensing element for detecting an image signal and an optical system for forming an optical image of an object on said video image sensing element, a focusing mechanism for moving said optical system to perform a focusing operation.

a focusing mechanism driving apparatus for driving said focusing mechanism over a range between an initial position and a final position, which range represents an entire range of possible focus positions to detect an image signal at every stepwise shift of said optical system, a scanning line selection circuit for indicating a predetermined number of consecutive scanning lines from scanning lines of one field, an A/D converter for converting said predetermined number of consecutive scanning lines into digital image data, a frame memory for memorizing said digital image data, subdivided into a plurality of addresses, one for each of said focusing positions, a memory address control circuit for setting addresses at which said digital image data are stored, calculation means for calculating contrasts of video images represented by said digital image data stored in said frame memory, wherein said digital image data respectively represent video images at all of said possible focusing positions, comparing means for comparing said contrasts from said calculating means with each other and determining a video image having a highest value among said video images, address determining means for determining an optimum focus address where said video image having the highest contrast is stored, and a focus setting circuit for outputting a signal to said focusing mechanism driving apparatus representing a position of the optical system corresponding to said optimum focus address.

8. An automatic focusing apparatus in accordance with claim 7, wherein said scanning lines selection circuit selects five consecutive scanning lines.

9. An automatic focusing apparatus as in claim 7, wherein there are seventeen of said focusing positions.

* * * * *